United States Patent
Oh

(10) Patent No.: US 11,864,684 B2
(45) Date of Patent: Jan. 9, 2024

(54) SINGLE-SERVE REFILL POD

(71) Applicant: Sung Oh, West Covina, CA (US)

(72) Inventor: Sung Oh, West Covina, CA (US)

( * ) Notice: Subject to any disclaimer, the term of this patent is extended or adjusted under 35 U.S.C. 154(b) by 178 days.

(21) Appl. No.: 17/229,810

(22) Filed: Apr. 13, 2021

(65) Prior Publication Data

US 2021/0353092 A1    Nov. 18, 2021

Related U.S. Application Data

(63) Continuation of application No. 16/656,510, filed on Oct. 17, 2019.

(60) Provisional application No. 63/009,436, filed on Apr. 13, 2020.

(51) Int. Cl.
| | | |
|---|---|---|
| *B65D 85/804* | (2006.01) | |
| *A47J 31/06* | (2006.01) | |
| *A47J 31/40* | (2006.01) | |
| *A47J 31/46* | (2006.01) | |

(52) U.S. Cl.
CPC ......... *A47J 31/0652* (2013.01); *A47J 31/407* (2013.01); *A47J 31/46* (2013.01); *B65D 85/8043* (2013.01); *B65D 85/8052* (2020.05); *B65D 85/8061* (2020.05); *A47J 31/0689* (2013.01); *B65D 85/8046* (2013.01)

(58) Field of Classification Search
CPC ................ A47J 31/0689; A47J 31/0668; A47J 31/3676; A47J 31/407; B65D 85/8043; B65D 85/8046; B65D 85/8052

USPC .......................................... 99/295, 322, 323
See application file for complete search history.

(56) References Cited

U.S. PATENT DOCUMENTS

| | | | | |
|---|---|---|---|---|
| 7,926,415 | B2* | 4/2011 | Yoakim | B65D 85/8064 426/77 |
| 8,561,524 | B2* | 10/2013 | DeMiglio | A47J 31/0689 99/305 |
| 2004/0250686 | A1* | 12/2004 | Hale | A47J 31/0673 99/295 |
| 2012/0321748 | A1* | 12/2012 | Otto | A47J 31/085 99/302 R |
| 2013/0017303 | A1* | 1/2013 | Vu | A47J 31/0689 426/433 |
| 2013/0323381 | A1* | 12/2013 | Dakis | A47J 31/404 99/302 R |
| 2015/0068404 | A1* | 3/2015 | Rivera | A47J 31/4492 99/323 |
| 2015/0353272 | A1* | 12/2015 | Mariller | B65D 85/8061 426/433 |
| 2018/0220834 | A1* | 8/2018 | Moon | A47J 31/56 |
| 2020/0231373 | A1* | 7/2020 | Liu | B65D 85/8043 |

* cited by examiner

*Primary Examiner* — Reginald Alexander
(74) *Attorney, Agent, or Firm* — Scott R. Hansen; Viking IP Law

(57) ABSTRACT

Refillable pod can be reused to brew a beverage with a single-serve brewer. The refillable pod has a funnel at about six O'clock position near the front of the cap to drain the beverage without substantially coming to contact the brewing mechanism. The refillable pod may have a handle which can be used by the user to insert the refillable pod into the brewer so that funnel can be positioned at about six O'clock position within the brewing mechanism.

18 Claims, 7 Drawing Sheets

SINGLE-SERVE REFILL POD

1. Related Application

This non-provisional application claims priority to: (1) a U.S. provisional patent application Ser. No. 63/009,436, entitled "Single-Serve Beverage System," filed Apr. 13, 2020; and (2) a U.S. utility patent application Ser. No. 16/656,510, entitled "Controlling Brewing Parameters of Single-Serve Beverage System," filed Oct. 17, 2019, which are both hereby incorporated by reference in their entirety.

2. Field of the Invention

A reusable single-serve pod can receive beverage ingredient and brew a beverage in a substantially horizontal position; and in particular, the reusable single-serve pod has a cap that can open and close relative to a filter to receive and discard the beverage ingredient therein, such as coffee ground, to brew a beverage in a substantially horizontal position and pour the beverage juxtaposed to the cap.

3. Background of the Invention

The following background discussion is not an admission that the matters discussed below are citable as prior art or common general knowledge. Rather, the general background information disclosed herein is directed to describing the problem(s) associated with the current state of the art, and a need for a better solution.

Single-serve pod systems are popular for their convenience where a user can select from variety of pre-packed pods with different flavors, and inserting a pre-packed pod into a brewer and with a simple push of a button, the brewer will brew a cup of beverage within a few minutes. Despite the convenience of single-serve pods, some coffee drinkers want an option to brew their own coffee ground at home with the brewer. Accordingly, there is a need for a pod that allows users to pack their own beverage ingredient into the pod to brew a beverage with the brewer; and reuse the pod at a later time.

INVENTION SUMMARY

One of the aspects of the invention is to provide a refillable pod having a proximal end and a distal end, the pod comprising: a filter having a first opening juxtaposed to the proximal end adapted to receive beverage ingredient, and a filtering material covering at least a portion of the filter to allow a beverage to pass therethrough; a container having a second opening adapted to receive the filter to form a pathway between the filter and the container, the container having a funnel at about six O'clock position juxtaposed to the second opening to allow the beverage to flow along the pathway drain via the funnel; and a cap adapted to enclose the beverage ingredient within the filter and adapted to receive an inlet piercing member to inject heated water into the filter.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1A:
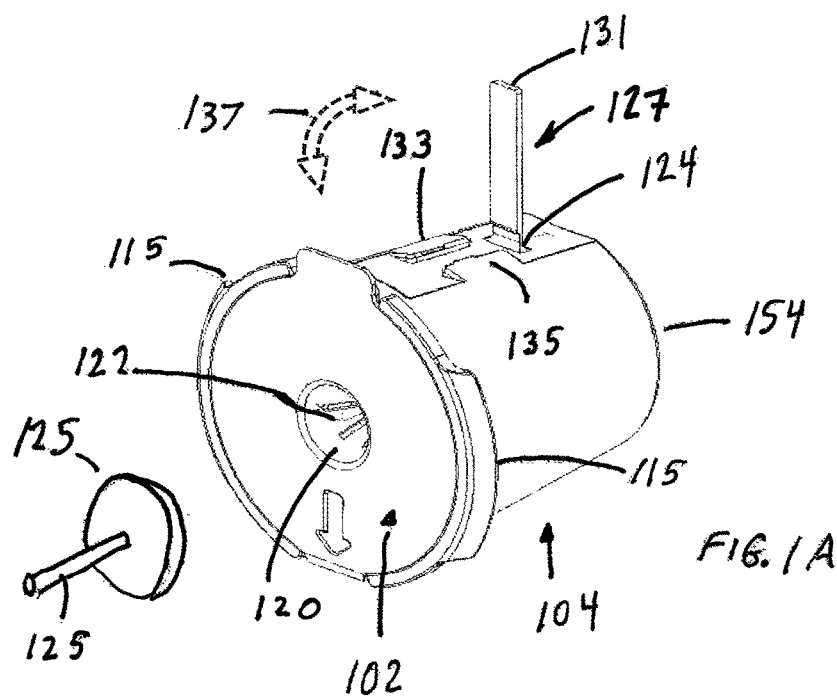
FIG. 1A illustrates a perspective view of a refillable pod.

The various aspects of the invention can be better understood with reference to the drawings and descriptions described below. The components in the figures, however, are not necessarily to scale, emphasis is instead placed upon illustrating the principles of the various aspects of the invention. The claimed invention is not limited to apparatuses or methods having all of the features of any one apparatus or method described below or to features common to multiple or all of the apparatuses described below. The claimed invention may reside in a combination or subcombination of the apparatus elements or method steps described below. It is possible that an apparatus or method described below is not an example of the claimed invention. In general, when the terms "may", "is", and "are" are used as a verb in the description corresponding to a particular subject matter, these terms are generally used in this disclosure as an expression of a possibility of such subject matter rather than as a limiting sense such as when the terms "shall" and "must" are used. For example, when the description states that the subject matter "may be" or "is" circular, this is one of many possibilities, such that the subject matter can also include an oval, square, regular, irregular, and any other shapes known to a person of ordinarily skilled in the art rather than being limited to the "circular" shape as described and/or illustrated in the corresponding referenced figure. In addition, when the term "may", "is", and "are" are used to describe a relationship and/or an action, these terms are generally used in this disclosure as an expression of a possibility. For example, when the description states that a subject matter A "may be" or "is" adjacent to a subject matter B, this can be one of many possibilities including the possibility that the subject matter A is not adjacent to the subject matter B as it would be understood by a person ordinarily skilled in the art.

Moreover, it is within the scope of the invention to combine the various embodiments disclosed relating to one or more particular drawing and their corresponding descriptions with one or more of the other drawings and their corresponding descriptions disclosed herein and/or other references incorporated herein by reference where such a combination may be combined and practiced by one of ordinary skilled in the art. The phrase "single-serve beverage pod" in this disclosure generally refers to a single brewing process where a desired volume of beverage is brewed to serve one cup of beverage, however, it is within the scope of the invention to have a pod that packs sufficient beverage substance to brew multiple cups of beverage from a single brewing process or from multiple brewing processes. Also, the term "beverage substance" generally refers to the underline article when mixed with liquid such as water formulates a beverage such as coffee, tea, fruit drinks, punch, lemonade, soda, cocoa, milk, soup, energy drink, liquid medicine, cannabis, and the like. For instance, for coffee, the beverage substance may be coffee ground, instant powder coffee, and/or concentrated coffee in liquid form that can be diluted with water for consumption. For tea, the beverage substance may be tea ground, instant powder tea, and/or concentrated tea in liquid form that can be diluted with water for consumption. For baby milk, the beverage substance may be milk powder or concentrated milk liquid. For medicine such as for flu or cold, the beverage substance may be in the powder or liquid form which can be dissolved with predetermined portion of the heated water to brew a proper portion of the liquid medicine. Cannabis may be also provided in dried ground or powder form. In addition, the beverage substance may be provided in the form of pellets that are infused with desired flavors; and once the pellets are exposed to liquid such as water, the trapped flavors may be released by the pellet, which is then absorbed by the mixing liquid to formulate a beverage with the desired flavor. As such, the beverage substance may be in the form of ground, powder, liquid, pellets, and the like; and the beverage substance may be formulated from single or multiple ingredients. The same referenced numerals referred to in the drawings and descriptions generally correspond to same or similar parts throughout the disclosure.

Figure 1B:
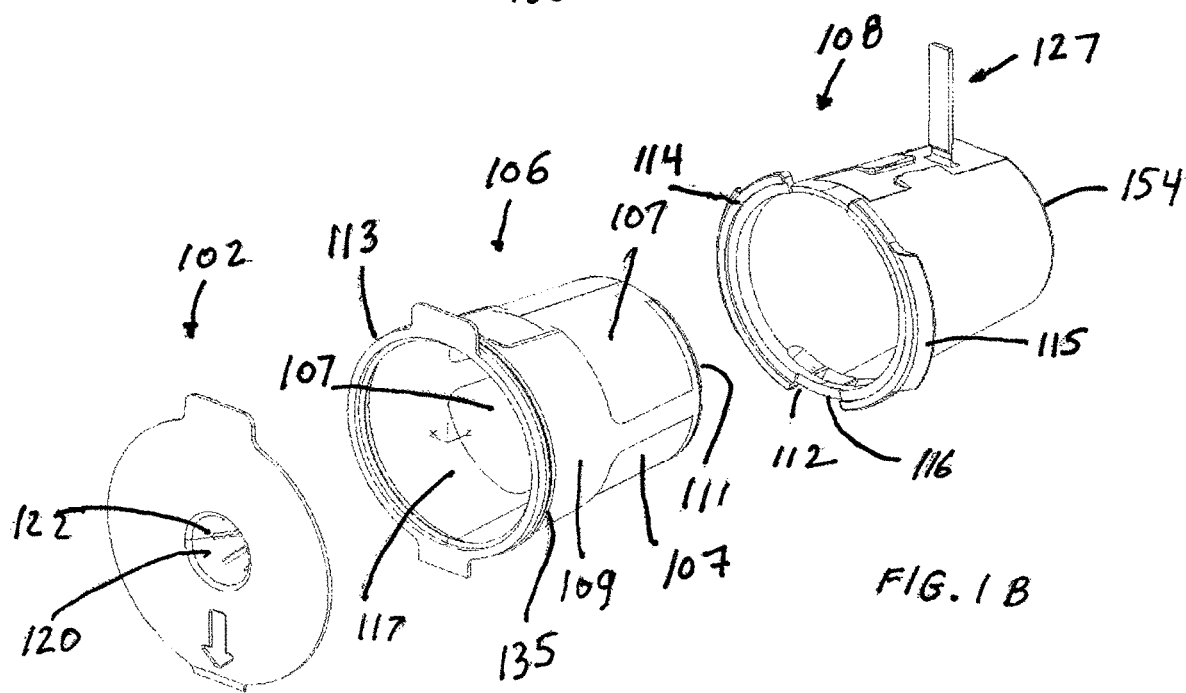
FIG. 1B illustrates an expanded view of the refillable pod of FIG. 1A

FIG. 1A illustrates a refillable pod 100 including a cover 102 adapted to enclose the housing 104; and FIG. 1B shows the refillable pod 100 of FIG. 1A in a disassembly state. The housing 104 may include an inner filter 106 adapted to fit inside an outer container 108. The filter 104 may have an opening 110 defined by an outer rim 113 adapted to hold a first gasket 135. The container 108 may have an opening 112 as defined by the outwardly extending extension 114; and the opening 112 may be adapted to receive the filter 106 such that the first gasket 135 may engage and seal the filter 106 with the opening 112 of the container 108. The extension 114 may also form a flap portion 115 that tappers downwardly towards the base 154 of the container 108 between about two and four O'clock positions and between about eight and eleven O'clock positions to allow the pod 100 to engage and work with a brewing chamber described in a U.S. non-provisional patent application Ser. No. 17/216,716, filed Mar. 30, 2021, entitled "Beverage Pod Brewing Chamber" (the '716 Application), which is hereby incorporated by reference in its entirety. The flap portions 115 may be formed from a flexible material such as rubber, soft plastic, and etc. so as to not damage the internal components of the brewing chamber used to work with the refill pod 100.

The outer rim 113 of the filter may be flush with the extension 114 of the container when the filter 106 is fully inserted into the container 108 such that the first gasket 135 may substantially engage, sealed, or join the filter 106 to the opening 112 of the container 108 to substantially prevent water from passing through therebetween. As discussed below in reference to FIG. 1F, a pathway may be formed between the inner filter 104 and the outer container 108 to allow the beverage to pass through a filter mesh 107 formed in the sidewall 109 and/or base 111 of the filter 104, and along the pathway and drain via a funnel 116 located at about the six O'clock position in reference to the rim 114 and juxtaposed to the rim 114 of the container 108. The cover 102 may have a cavity 120 defining an opening 122 where the diameter of the opening 122 may be smaller than the diameter of the seal 123 around the inlet piercing element 125 such that the seal may engage with the cover 102 to substantially prevent water from leaking out of the seal 123. Note that it is within the scope of the invention to have the extension 114 extending outwardly from the opening 110 of the filter 104, and have the opening 112 of the container 108 attached to the underside of the extension of the filter 104.

The container 108 may have a handle 127 having proximal end 129 and a distal end 131. The proximal end 129 may be pivotably coupled to the container 108 to allow the handle 127 to pivot between an open position, as illustrated in FIG. 1, and a closed position, as illustrated in FIG. 1G below, as indicated by the double ended direction arrow 137. And as further discussed below, a user may grab the distal end 131 to guide the refillable pod 100 into a brewing chamber 200, as illustrated below in FIG. 2, to properly orient the pod 100 within the brewing chamber 200 to avoid interference between the pod 100 and the brewing chamber 200. The container 108 may also have one or more grippers 133 and 135 to hold the handle in the closed position once the handle moves from the open position to the closed position.

Figure 1C:
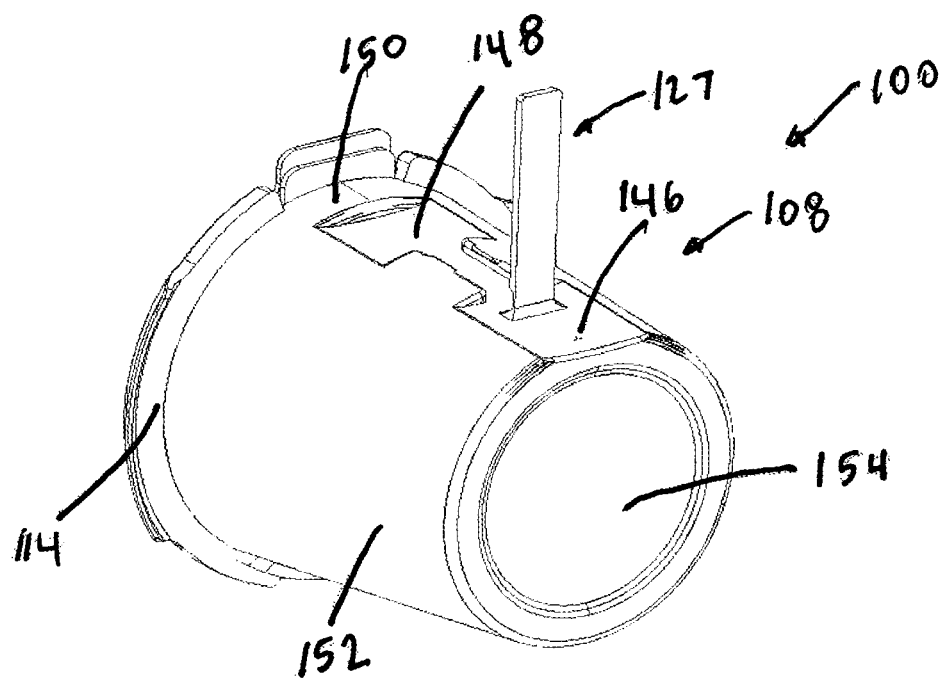
FIG. 1C illustrates a rear perspective of the refillable pod.
Figure 1D:
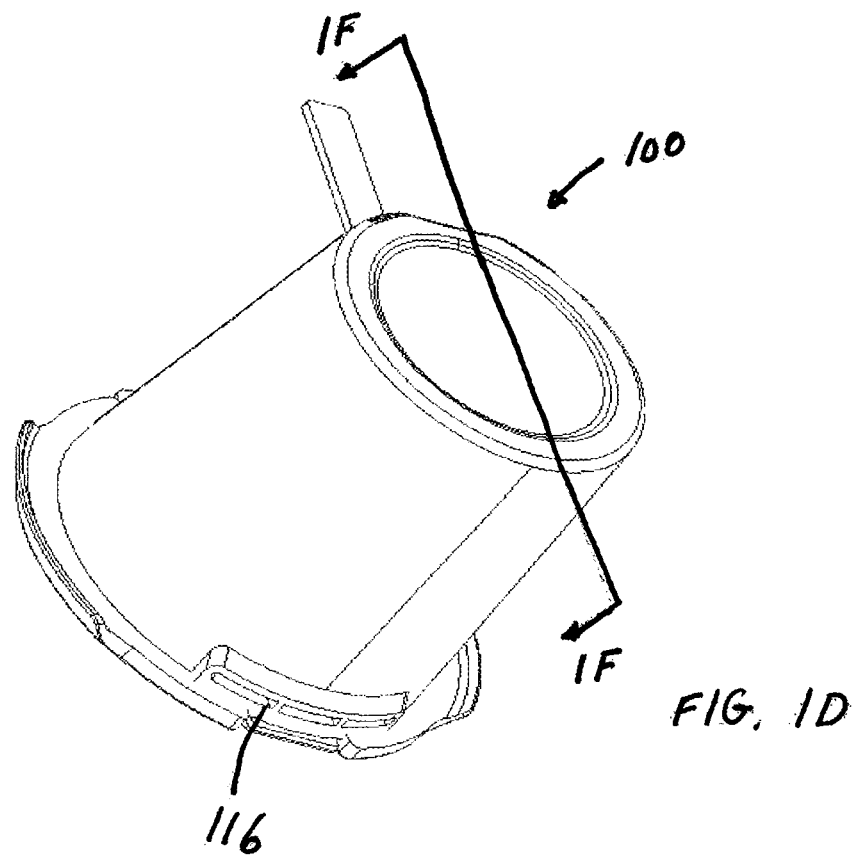
FIG. 1D illustrates an underside perspective view of the refillable pod.

FIG. 1C shows a rear perspective view of the pod 100. The container 108 may have a substantially flat portion 146 at about 12 O'clock position to form recess area 148. The handle 127 may be formed on the flat portion 146 such that when the handle 127 is in the closed position, the handle 127 may be within the recess area 148 without protruding outwardly above the 12 O'clock surface area 150 to allow the refill pod 100 to fully insert into a holder 204, as illustrated below in FIG. 2C below without substantial interference. The container 108 has a sidewall 152 between a base 154 and the rim 114 adapted to received within the holder without interference. FIG. 1D shows rear underside view of the pod 100 showing the funnel 116 at about the six O'clock position.

Figure 1E:
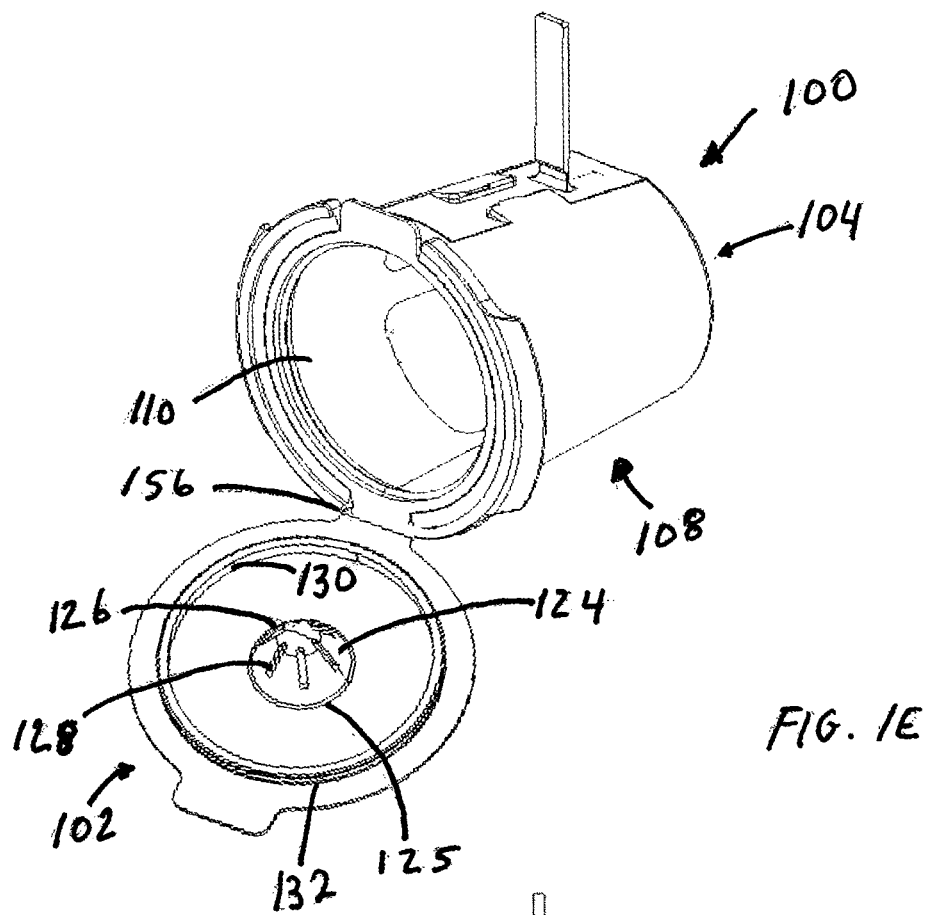
FIG. 1E illustrates the refillable pod with the cover open.

FIG. 1E illustrates that the cap 102 may be pivotably coupled to the housing 104 by either being coupled to the filter 106 or the container 108. In this embodiment, the cap 102 may be pivotably coupled to the filter 106 about a pivot axis 156 for ease of use and to prevent the cap 102 from being misplaced. The underside view of the cover 102 illustrates that the cavity 120 forms a protrusion 124 with a tip 126 configured to penetrate into the beverage ingredient packed within the filter 104. The protrusion may have a number of slits 128 to distribute the water entering the cavity 120. The cover 102 may also have a sealing skirt 130 adapted to engage with the opening 110 of the filter 104 to substantially prevent water from leaking out of the filter 104. The sealing skirt 130 may be a second gasket 132 adapted to seal the gap between the cover 102 and the filter 104. Alternatively, for high pressure beverage applications such as espresso, the sealing skirt 130 may be treaded to rotatably engage with the inner thread formed within the inner surface of the filter 104 near the opening 110 to withstand the high pressure within the filter 104.

Figure 1F:
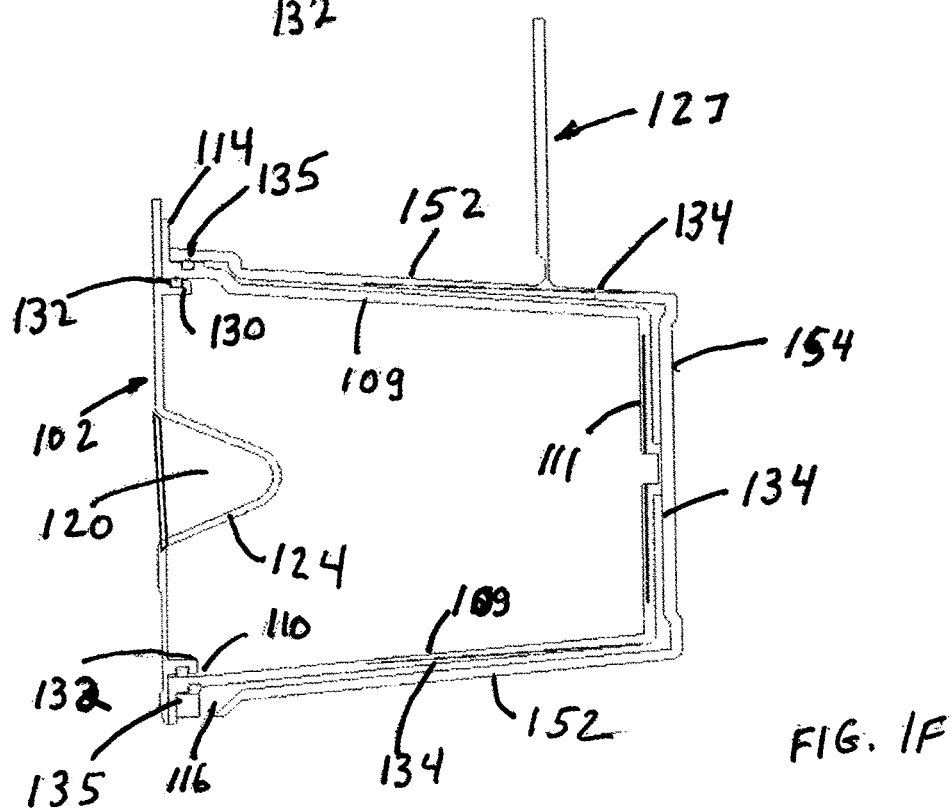
FIG. 1F illustrates a cross-sectional view of the refillable pod along the line 1F-1F in FIG. 1D.
Figure 1G:
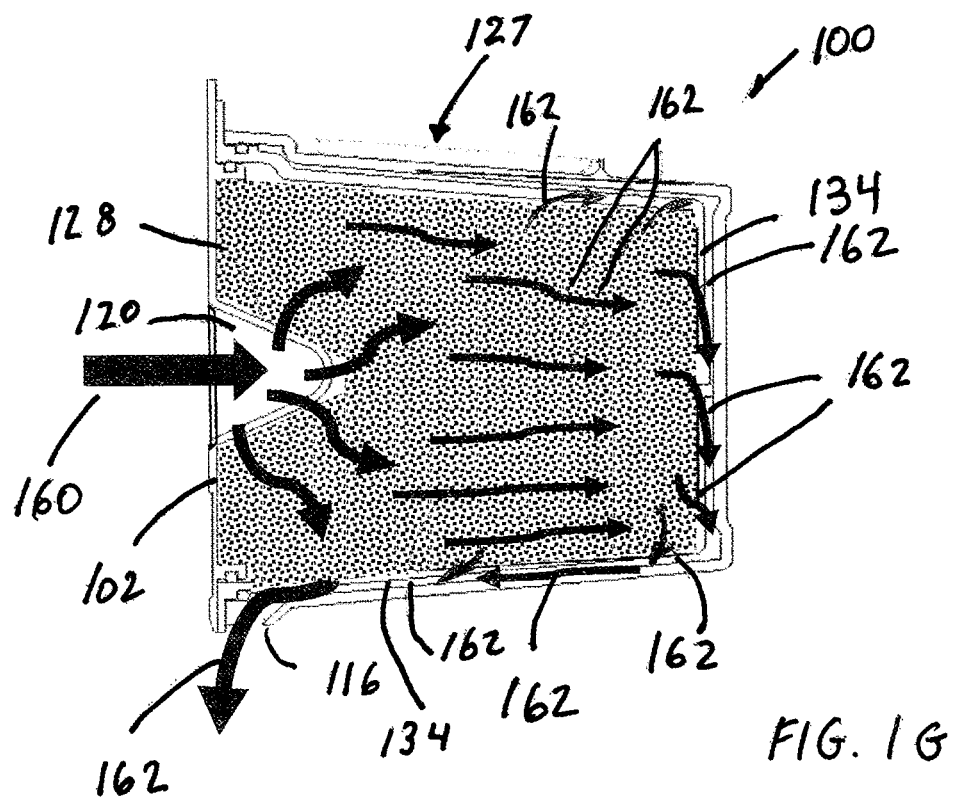
FIG. 1G illustrates beverage flow path within the refillable pod and draining the beverage.

FIG. 1F shows a cross-sectional view of the pod 100 along the sectional line 1F-1F shown in FIG. 1D. FIG. 1F shows that once the refill pod 100 is assembled, the sealing skirt 130 of the cover 102 may be within the opening 110 of the filter 104, and the second gasket 132 may substantially seal the beverage ingredient within the filter 104. In addition, when the filter 106 is fully inserted into the container 108, the first gasket 135 may be juxtaposed to the rim 114 of the container 108 to substantially seal the beverage within container 108 other than to allow the beverage to drain via the funnel 116. The outer configuration of the inner filter 104 as defined by its sidewall 109 and base 111 may be smaller than the outer container 108 as defined by its sidewall 152 and base 154 to form a pathway 134 between the filter 106 and the container 108 to allow the beverage to drain via the funnel 116.

FIG. 1G illustrates the handle 127 in the closed position and flush within the recess area 148, and the filter 106 packed with the beverage ingredient to brew a beverage. Once heated water 160 is injected into the cavity 120, the heated water may exit through the slits 128 to interact with the beverage ingredient to extract the flavors from the beverage ingredient forming a beverage 162 where the pressure from the inlet piercing member 125 may push the extracted beverage towards the base 111 of the filter 106 to allow the beverage to exit through the mesh 107 on the sidewall 109 and base 111 of the filter as indicated by the direction arrows 162 and drain out of the refillable pod 100 via the funnel 116. Note that that the distal ends of the funnel 116 and the cover 102 at about the six O'clock position may be tapered to avoid engaging with the detaching member as it slides laterally as discussed in more detail below. The cover 102 may be coupled to the filter 106 to allow the cover 102 to move between an open position and a closed position to allow the beverage ingredient to be packed within the filter 106 in the open position, and then moved to the closed position to seal the beverage ingredient within the filter 106. For high pressure applications, the cover 102 may rotated onto the filter 106 or the container 108.

Figure 2A:
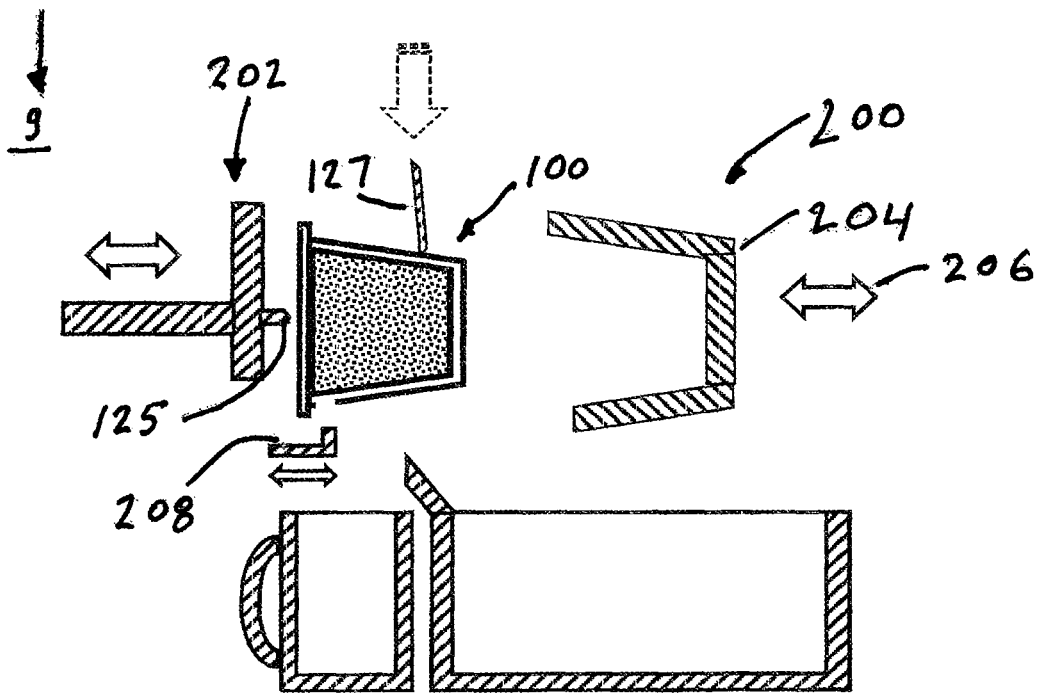
FIG. 2A illustrates the brewing chamber in an open position to receive a pod.
Figure 2B:
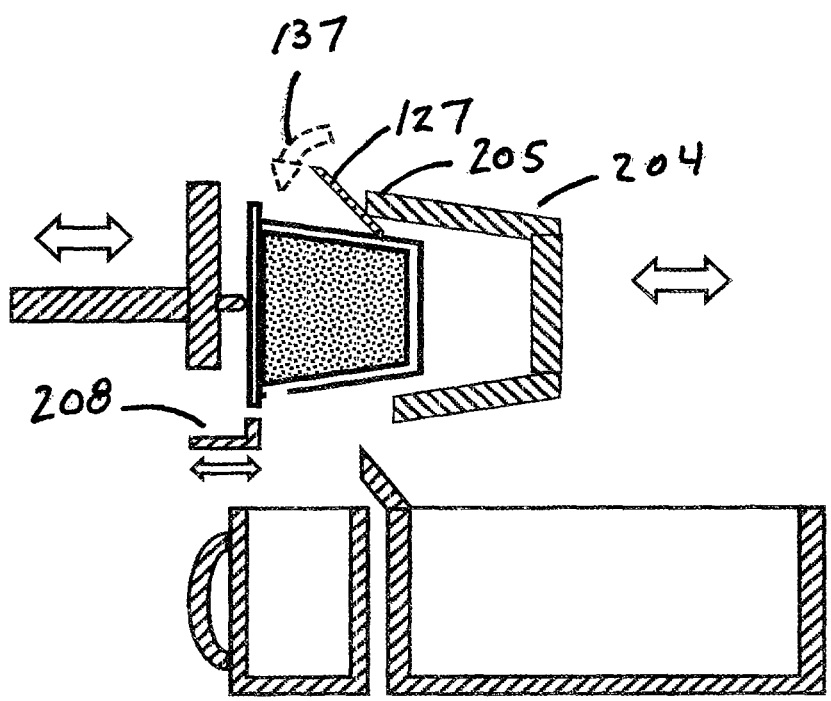
FIG. 2B illustrates the brewing chamber in a partially closed position with a pod therewithin.
Figure 2C:
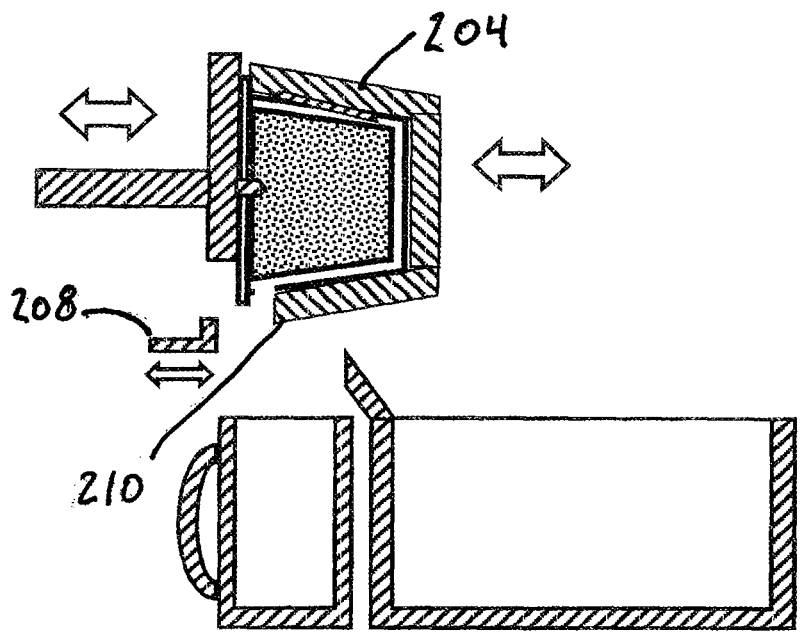
FIG. 2C illustrates the brewing chamber in a closed position with a pod therewithin.

FIGS. 2A through 2F illustrate schematic diagrams of a brewing chamber 200, which generally describes some aspect of the brewing chamber disclosed in the '716 Application. Note that the discussion of the brewing chamber 200 herein should not in any way limit the scope of the invention in the '716 Application, as the discussion here is for illustrative purpose only. One of the aspects of the invention is to adapt the refill pod 100 to engage and work the brewing chamber 200 in a manner discussed below. The brewing chamber 200 may include a cover 202 with the inlet piercing element 125 protruding therefrom and a holder 204 adapted to slide relative to each other along a lateral direction as indicated by the double ended direction arrows 206. Either one or both of the cover 202 and/or the holder 204 may be mechanically coupled to an actuator (not shown here) to move between an open position, as illustrated in FIG. 2A, and a closed position, as illustrated in FIG. 2C. The brewing chamber 200 may also include a detaching member 208 adapted to slide laterally. In the open position, the brewing chamber 200 may be adapted to receive the pod 100 between the cover 202 and the holder 204, and with the detaching member 208 underneath the pod 100

FIG. 2B shows the holder 204 sliding towards the closed position; and as it does the 12 O'clock position of the holder 204, as indicated by the reference numeral 205, may push the handle 127 towards the closed position as indicated by the direction arrow 137. As the holder 204 moves towards the closed position, the detaching member 208 may also slide towards the closed position as well. The pod 100 may be tapered between the four O'clock and eight O'clock positions to avoid interfering with the detaching member 208 sliding between the open and closed positions.

FIG. 2C illustrates the holder 204 and the detaching member 208 in a closed position where the holder 204 has been tapered between the four O'clock and eight O'clock positions, as indicated by the reference numeral 210, to avoid interfering with the beverage draining from the pod 100, and the detaching member 208 may on the front side of the cover 102 of the pod 100 to also avoid interfering with the beverage draining from the pod 100. In addition, as the holder 204 fully closes, the holder 204 may push the handle 127 into the grippers 133 and 135 to hold the handle 127 in the closed position.

Figure 2D:
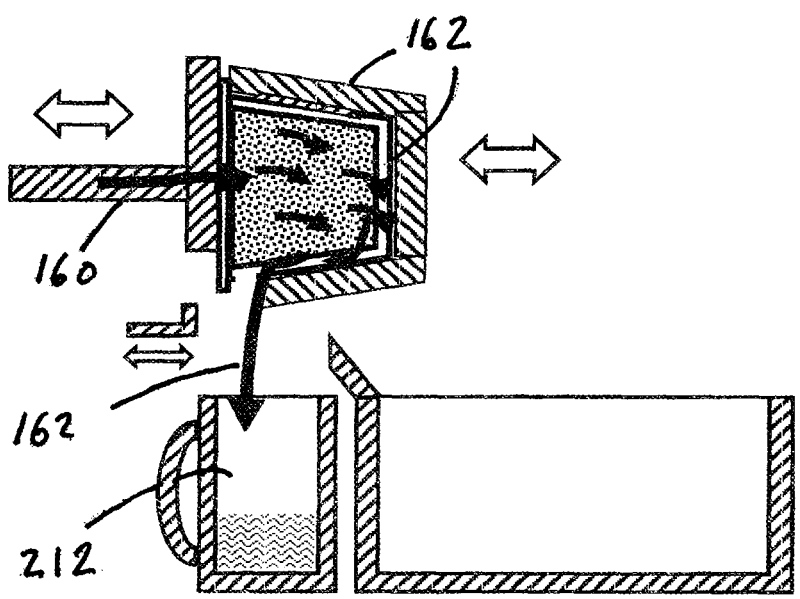
FIG. 2D illustrates brewing a beverage within the pod and draining the beverage therefrom into a mug without substantially contaminating the beverage by the brewing chamber.

FIG. 2D illustrates heated water 160 being injected into the pod 100 via the inlet piercing member 125. As the heated water washes the beverage ground, such as coffee ground, beverage may be extracted from the beverage ground and pass through the filter 106 as indicated by the direction arrows 162 and pass along the pathway 134 and drain via the funnel 116 and pour into a mug 212. The detaching member 208 may be in the extended position to avoid coming into contact with the beverage 162 pouring into the mug to substantially prevent cross-contamination of the beverage.

Figure 2E:
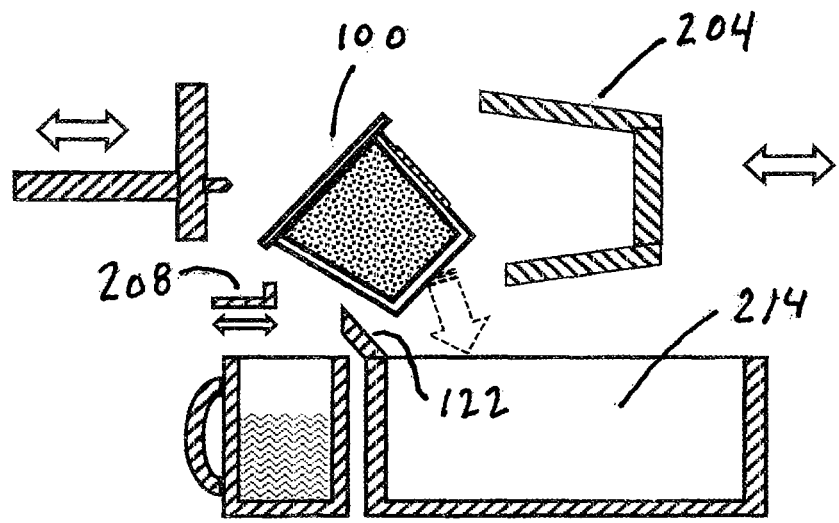
FIG. 2E illustrates the brewing chamber in an open position and dispensing the pod.
Figure 2F:
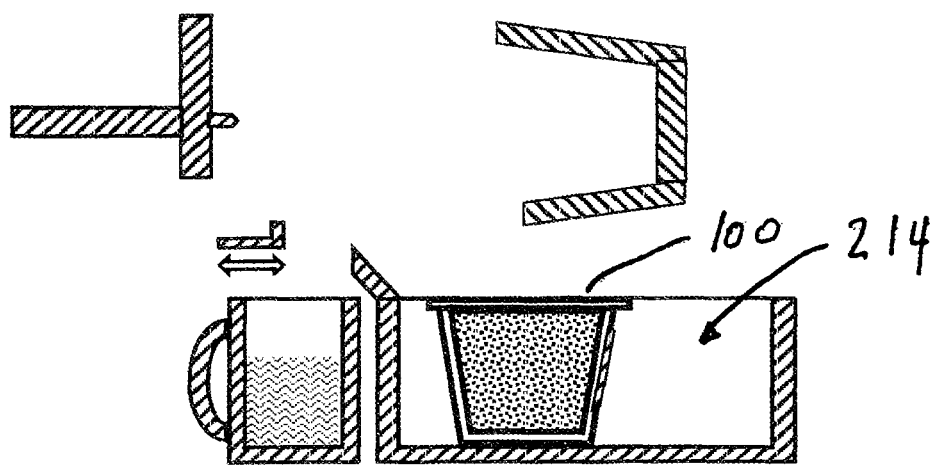
FIG. 2F illustrates the pod dispensed into a waste bin.

FIGS. 2E and 2F illustrate that once the brewing process is completed, the holder 204 may return to the open position to dispense the pod 100 and be ready to receive a new pod. As the holder 204 returns to the open position, the detaching member 208 may also return to the retracted position as illustrated in FIG. 2A. As the holder 204 returns to the open position, the pod 100 may disengage from the holder 204 and may drop onto a ramp 122 which may guide the pod 100 into a waste bin 214. Note that the grippers 133 and 135 may hold the handle 127 in the closed position as the pod 100 drops into the waste bin 1214 so that the handle 127 does not interfere with the pod 100 dropping into the waste bin.

While various embodiments of the invention have been described, it will be apparent to those of ordinary skill in the art that many more embodiments and implementations are possible within the scope of this invention. Moreover, various features and functionalities described in this application and Figures may be combined individually and/or a plurality of features and functionalities with others. Accordingly, the invention is not to be restricted except in light of the attached claims and their equivalents.

What is claimed is:

1. A refillable pod having a proximal end and a distal end, the pod comprising:
   a filter having a first opening juxtaposed to the proximal end adapted to receive beverage ingredient, and a filtering material covering at least a portion of the filter to allow a beverage to pass therethrough;
   a container having a second opening adapted to receive the filter to form a pathway between the filter and the container, the container having a funnel at about six O'clock position juxtaposed to the second opening to allow the beverage to flow along a pathway drain via the funnel, where the container has a handle with a proximal end and a distal end, and the distal end of the handle is pivotably coupled to the container at about 12 O'clock position and juxtaposed to the distal end of the container; and
   a cap adapted to enclose the beverage ingredient within the filter and adapted to receive an inlet piercing member to inject heated water into the filter.

2. A refillable pod according to claim 1, where the container has an extension extending outwardly from the second opening juxtaposed to the proximal end and forming a flange that tappers towards the distal end.

3. A refillable pod according to claim 1, where the container has a substantially flat portion at about 12 O'clock position to form recess area adapted to receive the handle in the closed position.

4. A refillable pod according to claim 1, where the container has at least one gripper adapted to engage with the handle in a closed position.

5. A refillable pod according to claim 2, where the flange portion is made of flexible material.

6. A refillable pod according to claim 2, where the extension extends outwardly from the second opening from about two O'clock to four O'clock positions, and from about eight O'clock to ten O'clock positions.

7. A refillable pod having a proximal end and a distal end, the pod comprising:
- a filter having a first opening juxtaposed to the proximal end adapted to receive beverage ingredient, and a filtering material covering at least a portion of the filter to allow a beverage to pass therethrough;
- a container having a second opening adapted to receive the filter to form a pathway between the filter and the container, the container having a funnel at about six O'clock position juxtaposed to the second opening to allow the beverage to flow along a pathway drain via the funnel, where the container has a handle with a proximal end and a distal end, and the distal end of the handle is pivotably coupled to the container at about 12 O'clock position and juxtaposed to the distal end of the container; and
- a cap adapted to close and open to the container, in the open position where the first opening is opened to allow the beverage ingredient to fill the filter, and the closed position, the cap has a center protrusion to adapted to receive an inlet piercing member to inject heated water into the filter.

8. A refillable pod according to claim 7, where the container has an extension extending outwardly from the second opening juxtaposed to the proximal end and forming a flange that tappers towards the distal end.

9. A refillable pod according to claim 7, where the container has a substantially flat portion at about 12 O'clock position to form recess area adapted to receive the handle in the closed position.

10. A refillable pod according to claim 7, where the container has at least one gripper adapted to engage with the handle in a closed position.

11. A refillable pod according to claim 8, where the flange portion is made of flexible material.

12. A refillable pod according to claim 8, where the extension extends outwardly from the second opening from about two O'clock to four O'clock positions, and from about eight O'clock to ten O'clock positions.

13. A refillable pod having a proximal end and a distal end, the pod comprising:
- a filter having a first opening juxtaposed to the proximal end adapted to receive a beverage ingredient; and
- a container having a second opening adapted to receive the filter to form a pathway between the filter and the container, the container having a funnel at about six O'clock position juxtaposed to the second opening to allow the beverage to flow along a pathway drain from the pod, where the container has a handle with a proximal end and a distal end, and the distal end of the handle is pivotably coupled to the container at about 12 O'clock position and juxtaposed to the distal end of the container.

14. A refillable pod according to claim 13, including a cap adapted to enclose the beverage ingredient within the filter and adapted to receive an inlet piercing member to inject heated water into the filter.

15. A refillable pod according to claim 13, where the container has an extension extending outwardly from the second opening juxtaposed to the proximal end and forming a flange that tappers towards the distal end.

16. A refillable pod according to claim 13, where the container has a substantially flat portion at about 12 O'clock position to form recess area adapted to receive the handle in the closed position.

17. A refillable pod according to claim 13, where the container has at least one gripper adapted to engage with the handle in a closed position.

18. A refillable pod according to claim 13, where the extension extends outwardly from the second opening from about two O'clock to four O'clock positions, and from about eight O'clock to ten O'clock positions.

* * * * *